(12) United States Patent
Izutsu et al.

(10) Patent No.: US 11,031,770 B2
(45) Date of Patent: Jun. 8, 2021

(54) ELECTRIC WORKING MACHINE AND VOLTAGE SUPPRESSOR CIRCUIT FOR ELECTRIC WORKING MACHINE

(71) Applicant: MAKITA CORPORATION, Anjo (JP)

(72) Inventors: Yuta Izutsu, Anjo (JP); Katsuhito Fujinami, Anjo (JP); Akira Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 210 days.

(21) Appl. No.: 16/099,219

(22) PCT Filed: Apr. 26, 2017

(86) PCT No.: PCT/JP2017/016592
§ 371 (c)(1),
(2) Date: Nov. 6, 2018

(87) PCT Pub. No.: WO2017/199719
PCT Pub. Date: Nov. 23, 2017

(65) Prior Publication Data
US 2019/0157857 A1    May 23, 2019

(30) Foreign Application Priority Data

May 20, 2016 (JP) .............................. JP2016-101620

(51) Int. Cl.
*H02H 3/20* (2006.01)
*B25F 5/00* (2006.01)
(Continued)

(52) U.S. Cl.
CPC .............. *H02H 3/20* (2013.01); *B23B 45/02* (2013.01); *B25F 5/00* (2013.01); *H02H 7/122* (2013.01);
(Continued)

(58) Field of Classification Search
USPC .......................................... 361/56, 91.1, 111
See application file for complete search history.

(56) References Cited

U.S. PATENT DOCUMENTS 5,640,071 A * 6/1997 Malaspina ................ H02J 7/14
318/139
5,675,169 A * 10/1997 Hoshi ................. H01L 27/0251
257/328
(Continued)

FOREIGN PATENT DOCUMENTS

JP    2011-020187 A    2/2011

OTHER PUBLICATIONS

Aug. 1, 2017 International Search Report issued in International Patent Application No. PCT/JP2017/016592.
(Continued)

*Primary Examiner* — Danny Nguyen
(74) *Attorney, Agent, or Firm* — Oliff PLC

(57) ABSTRACT

An electric working machine in one aspect of the present disclosure includes a main current-path, a driving unit including a motor and at least one first semiconductor-switching-element, a controller, a bypass current-path, a second semiconductor-switching-element, and a switch driver. The main current-path is arranged between a positive electrode and a negative electrode of a battery. The driving unit is situated in the main current path. The bypass current-path is arranged in parallel with the driving unit. The second semiconductor-switching-element is situated in the bypass current-path. The switch driver causes the second semiconductor-switching-element to interrupt the bypass current-path in an event that a voltage value of a drive voltage applied to the driving unit is less than a threshold value, and causes the second semiconductor-switching-element to
(Continued)

complete the bypass current-path in an event that the voltage value is equal to or greater than the threshold value.

6 Claims, 2 Drawing Sheets

(51) Int. Cl.
  *H02P 27/06* (2006.01)
  *H02H 7/122* (2006.01)
  *B23B 45/02* (2006.01)
  *H02P 29/024* (2016.01)

(52) U.S. Cl.
  CPC ........... *H02P 27/06* (2013.01); *H02H 7/1222* (2013.01); *H02P 29/024* (2013.01)

(56) References Cited

U.S. PATENT DOCUMENTS

| | | | | |
|---|---|---|---|---|
| 8,941,341 | B2 | 1/2015 | Rozman et al. | |
| 2005/0179463 | A1* | 8/2005 | Kasuya | H03K 17/102 326/83 |
| 2007/0103951 | A1* | 5/2007 | Ishikawa | H05K 7/209 363/146 |
| 2009/0268359 | A1* | 10/2009 | Chatty | H02H 9/046 361/56 |
| 2012/0026632 | A1* | 2/2012 | Acharya | H03K 17/081 361/56 |
| 2014/0063667 | A1* | 3/2014 | Saarinen | H01L 23/62 361/56 |
| 2014/0210379 | A1 | 7/2014 | Kato et al. | |
| 2014/0225544 | A1* | 8/2014 | Mergener | B25D 17/00 318/400.22 |
| 2014/0268431 | A1* | 9/2014 | Rozman | H02H 9/043 361/21 |
| 2015/0200535 | A1 | 7/2015 | Uesugi et al. | |
| 2015/0207449 | A1* | 7/2015 | Clendenen | H02H 9/042 318/400.22 |
| 2016/0172846 | A1* | 6/2016 | Kotani | H02H 9/04 361/56 |

OTHER PUBLICATIONS

Jan. 18, 2021 Office Action issued in Chinese Patent Application No. 201780031272.X.

* cited by examiner

ELECTRIC WORKING MACHINE AND VOLTAGE SUPPRESSOR CIRCUIT FOR ELECTRIC WORKING MACHINE

CROSS-REFERENCE TO RELATED APPLICATION

This international application claims the benefit of Japanese Patent Application No. 2016-101620 filed on May 20, 2016 with the Japan Patent Office, and the entire disclosure of Japanese Patent Application No. 2016-101620 is incorporated herein by reference.

TECHNICAL FIELD

The present disclosure relates to an electric working machine that is configured such that a motor is driven by electric power from a battery.

BACKGROUND ART

Various electric working machines, for example, electric grinders, electric circular saws, electric drivers, and electric grass cutters, that are configured such that a motor is driven by electric power from a battery and such that a working machine element (for example, a driver bit of an electric driver) is driven by a driving force of the motor are known.

As a driving method of the motor, a switching-drive method is known. The switching-drive method includes a semiconductor switching element arranged in a current path from the battery to the motor and controls ON and OFF of this semiconductor switching element (for example, duty control) to drive the motor.

The battery generally includes an inductive component therein. The inductive component is not only included in the battery, but also included in the current path from the battery to the motor. As a consequence, in the electric working machines configured such that the motor is driven by the switching-drive method, so-called spike voltage, which has a voltage value higher than a voltage value of the battery, occurs due to the inductive component inside or outside the battery in response to switching of the semiconductor switching element from ON-state to OFF-state.

Occurrence of the spike voltage may damage the semiconductor switching element and other circuit elements.

In contrast, as disclosed in the following Patent Document 1 for example, a technique to arrange an electrolytic capacitor in parallel with the battery is known. The parallel arrangement of the electrolytic capacitor with the battery can inhibit voltage fluctuation and an occurrence of the spike voltage with a help of the electrolytic capacitor.

PRIOR ART DOCUMENTS

Patent Documents

Patent Document 1: Japanese Unexamined Patent Application Publication No. 2014-144496

SUMMARY OF THE INVENTION

Problems to be Solved by the Invention

To inhibit voltage fluctuation by an electrolytic capacitor, the electrolytic capacitor needs to be large in size with a large capacity. This requires a large space inside an electric working machine to house the electrolytic capacitor, which accordingly leads to an increase in size of the electric working machine. In a case of the electric working machine configured to initiate electric conduction from a battery to a motor in response to turning ON of a switch by a user's manipulation, a large electric current temporarily flows into the electrolytic capacitor as an electric discharge from the battery is initiated. This may cause adhesion of a contact of the switch.

Desirably, one aspect of the present disclosure can effectively inhibit an occurrence of spike voltage due to switching operation of a semiconductor switching element for motor drive while inhibiting an increase in size of an electric working machine.

Means for Solving the Problems

An electric working machine in one aspect of the present disclosure includes a main current path arranged between a positive electrode and a negative electrode of a battery, a driving unit situated in the main current path, and a controller.

The driving unit includes a motor and at least one first semiconductor switching element. The motor is situated in the main current path. The at least one semiconductor switching element is situated upstream and/or downstream of the motor in the main current path. The controller is configured to turn ON or OFF the at least one first semiconductor switching element to thereby control drive of the motor.

The electric working machine further includes a bypass current path arranged in parallel with the driving unit, a second semiconductor switching element situated in the bypass current path and configured to complete or interrupt the bypass current path, and a switch driver.

The switch driver is configured to cause the second semiconductor switching element to interrupt the bypass current path in an event that a voltage value of a drive voltage applied to the driving unit is less than a threshold value. The switch driver is configured to cause the second semiconductor switching element to complete the bypass current path in an event that the voltage value of the drive voltage is equal to or greater than the threshold value.

In an event that the voltage value of the drive voltage applied to the driving unit is increased due to an occurrence of the spike voltage as the first semiconductor switching element is switched from ON-state to OFF-state, the bypass current path in the aforementioned electric working machine is still completed as long as the voltage value of the drive voltage becomes equal to or greater than the threshold value. Energy that increases the drive voltage is consequently consumed in the bypass current path, which inhibits further increase in the voltage value of the drive voltage in excess of the threshold value.

Accordingly, the electric working machine configured as mentioned above can effectively inhibit the occurrence of the spike voltage due to switching operation of the first semiconductor switching element for motor drive while inhibiting an increase in size of the electric working machine.

The switch driver may be configured to operate the second semiconductor switching element in an active region to complete the bypass current path in the event that the voltage value of the drive voltage is equal to or greater than the threshold value.

Operation of the second semiconductor switching element in the active region can inhibit an excess flow of electric current in the bypass current path.

The switch driver may include a Zener diode and a resistor coupled in series. More specifically, the Zener diode includes an anode and a cathode, the cathode being coupled to an upstream end of the bypass current path. The resistor includes a first end coupled to the anode of the Zener diode, and a second end coupled to a downstream end of the bypass current path. The switch driver is configured such that the Zener diode breaks down in the event that the voltage value of the drive voltage is equal to or greater than the threshold value. The switch driver is further configured such that an input voltage from the first end of the resistor is inputted to the second semiconductor switching element. The second semiconductor switching element is configured to complete the bypass current path with the input voltage inputted to the second semiconductor switching element due to the breakdown of the Zener diode.

According to this simple configuration including the Zener diode and the resistor coupled in series with each other, the second semiconductor switching element can be operated in the active region to complete the bypass current path in the event that the voltage value of the drive voltage is equal to or greater than the threshold value.

A switch portion may be arranged between the positive electrode of the battery and the driving unit in the main current path. The switch portion is configured to be turned ON or OFF in accordance with a manipulation by a user of the electric working machine to thereby complete or interrupt the main current path.

A voltage suppressor circuit for an electric working machine in another aspect of the present disclosure is installed in an electric working machine including the main current path, the driving unit, and the controller. The voltage suppressor circuit is arranged in parallel with at least the driving unit situated on the main current path. The voltage suppressor circuit includes the bypass current path, the second semiconductor switching element, and the switch driver.

Accordingly, the voltage suppressor circuit configured as above can effectively inhibit the occurrence of spike voltage due to switching operation of the first semiconductor switching element for motor drive while inhibiting an increase in size of the electric working machine.

EXPLANATION OF REFERENCE NUMERALS

1 . . . electric working machine, 2 . . . motor, 3 . . . battery, 4 . . . motor driver, 5 . . . manipulation switch, 6 . . . rotation sensor, 10 . . . working machine element, 11 . . . switching circuit, 12 . . . controller, 13 . . . gate driver, 14 . . . rotational information detector, 15 . . . current detection circuit, 16, 33, 34, 37 . . . resistor, 21 . . . main current path, 30 . . . voltage suppressor circuit, 31 . . . bypass current path, 32 . . . switch driver, 36 . . . Zener diode, Q1-Q6, Q20 . . . switching element, Q10 . . . switch.

MODE FOR CARRYING OUT THE INVENTION

Hereinafter, an example embodiment of the present disclosure will be explained with reference to the drawings.

(1) Overall Configuration of Electric Working Machine

Figure 1:
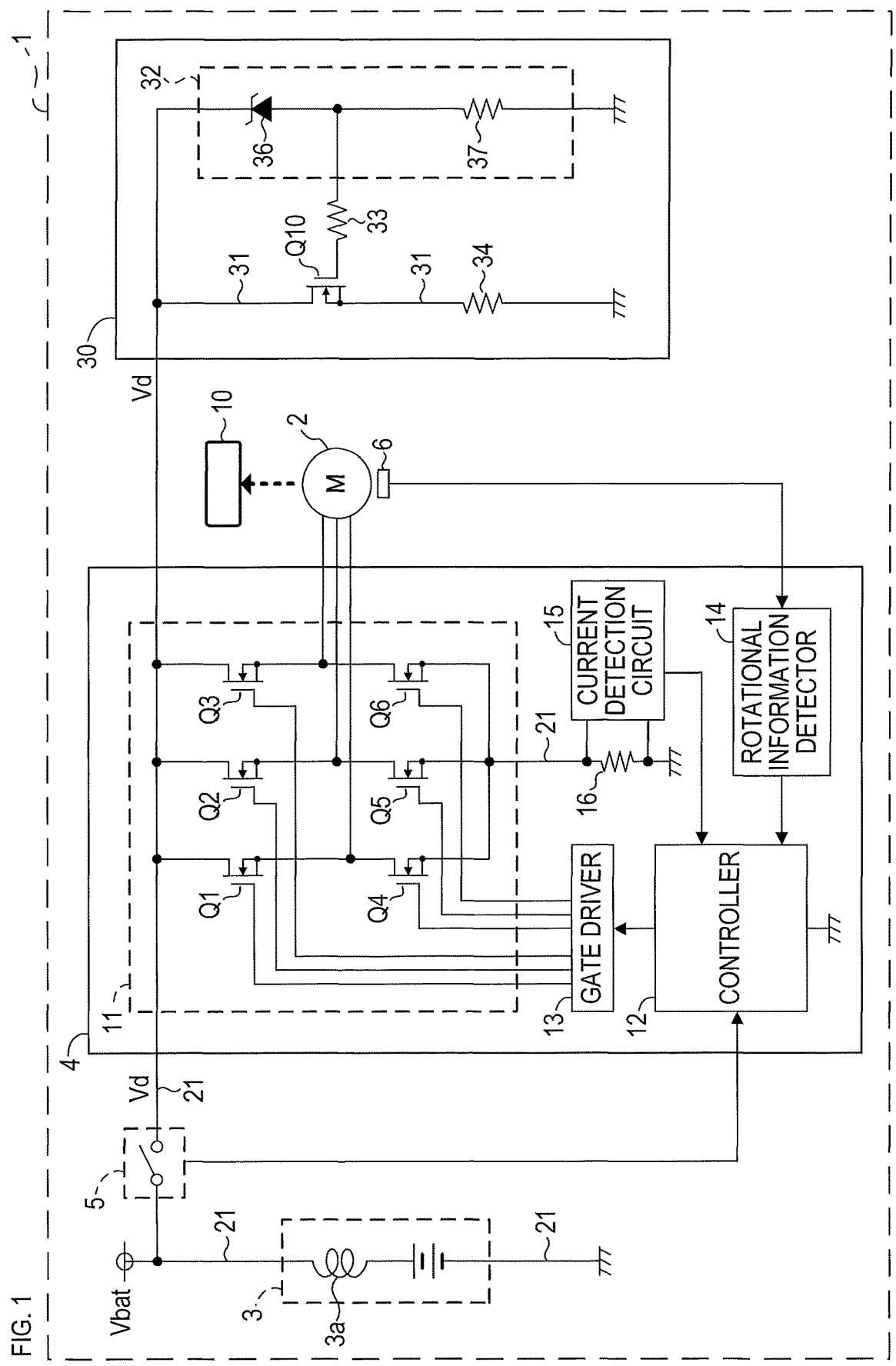
FIG. 1 is an electric circuit diagram showing a configuration of an electric working machine in an embodiment.

An electric working machine 1 in the present embodiment shown in FIG. 1 is configured as one of many types of electric working machines, such as electric grinders, electric circular saws, electric jigsaws, electric reciprocating saws, electric drivers, electric impact drivers, electric driver drills, electric grass cutters, and electric hedge trimmers.

As shown in FIG. 1, the electric working machine 1 in the present embodiment includes a motor 2, a battery 3, a motor driver 4, a manipulation switch 5, and a voltage suppressor circuit 30.

The motor 2 is a driving source of a working machine element 10. In the present embodiment, the motor 2 is a brushless motor. The working machine element 10 differs depending on the type of the electric working machine 1. For example, if the electric working machine 1 is an electric circular saw, then the working machine element 10 is a rotary blade (so-called chip saw). For example, if the electric working machine 1 is an electric driver, then the working machine element 10 is a driver bit.

The motor 2 is equipped with a rotation sensor 6 for detecting a rotational position of the motor 2. The rotation sensor 6 in the present embodiment is a Hall sensor, for example. The rotation sensor 6 generates a rotation detection signal that corresponds to the rotational position of the motor 2 and outputs the rotation detection signal to a rotational information detector 14 in the motor driver 4.

The battery 3 is a direct current power source to drive the motor 2. In the present embodiment, the battery 3 is a lithium ion rechargeable battery including two or more cells coupled in series. The battery 3 may include, for example, two or more cells coupled in series. Alternatively, the battery 3 may include two or more cell groups coupled in series; and each cell group may include two or more cells coupled in parallel with one another. The number of cells in the battery 3 is not limited to a specific number. The manner of coupling the cells in the battery 3 is not limited to a specific manner. The battery 3 may be a rechargeable battery other than the lithium ion rechargeable battery, or may be a non-rechargeable battery. The battery 3 may be built in the electric working machine 1, or may be attachable to and detachable from a main body of the electric working machine 1.

The battery 3 includes an internal resistance and, as shown in FIG. 1, also includes an inductive component 3a. The inductive component 3a may instantaneously cause a high voltage (so-called spike voltage) in response to, for example, a sudden interruption to an electric discharge from the battery 3.

A positive electrode and a negative electrode of the battery 3 are coupled to each other via a main current path 21 for an electric current to flow from the positive electrode to the negative electrode of the battery 3. The main current path 21 is more specifically a current path disposed from the positive electrode of the battery 3 to the negative electrode of the battery 3 via the manipulation switch 5, a switching circuit 11 and the motor 2 in the motor driver 4, a resistor 16, and a ground (earth) line.

The manipulation switch 5 is situated upstream of the motor driver 4 in the main current path 21 (that is, on the side of the positive electrode of the battery 3 with respect to the motor controller 4). The manipulation switch 5 is turned ON or OFF in accordance with a manipulation by a user of the electric working machine 1. In response to the manipulation switch 5 being turned ON, the main current path 21 is completed; and in response to the manipulation switch 5 being turned OFF, the main current path 21 is interrupted.

The manipulation switch 5 is electrically coupled to a controller 12 in the motor driver 4. The manipulation switch 5 is configured to input, to the controller 12, manipulation information that indicates a manipulated state of the manipulation switch 5. The manipulation information includes information indicating whether the manipulation switch 5 is ON or OFF.

The electric working machine 1 in the present embodiment is configured to enable the user to switch a rotational frequency of the motor 2 continuously or in stages by manipulating the manipulation switch 5. The manipulation information inputted from the manipulation switch 5 to the controller 12 includes rotational frequency command information to instruct the controller 12 on the rotational frequency of the motor 2.

The motor driver 4 includes the switching circuit 11, the controller 12, a gate driver 13, the rotational information detector 14, a current detection circuit 15, and the resistor 16.

The switching circuit 11 is situated downstream of the manipulation switch 5 in the main current path 21. The resistor 16 is situated downstream of the switching circuit 11 in the main current path 21.

The switching circuit 11 is a circuit to complete or interrupt electric conduction to a U-phase, a V-phase, and a W-phase of the motor 2. The switching circuit 11 includes three switching elements Q1, Q2, and Q3 (so-called high-side switches) situated upstream of the motor 2 in the main current path 21. The switching circuit 11 also includes three switching elements Q4, Q5, and Q6 (so-called low-side switches) situated downstream of the motor 2 in the main current path 21. These six switching elements Q1 to Q6 are n-channel MOSFETs in the present embodiment.

The current detection circuit 15 is coupled to both ends of the resistor 16. The current detection circuit 15 detects a current value of the electric current that flows in the motor 2 based on the voltage across the resistor 16 and outputs electric current detection information indicating the detected current value to the controller 12.

The rotational information detector 14 detects the rotational position (in other words, rotational angle) of the motor 2 based on the rotation detection signal inputted from the rotation sensor 6. The rotational information detector 14 outputs rotational information indicating the detected rotational position to the controller 12.

In the present embodiment, the controller 12 includes a microcomputer that includes a CPU, a memory, and the like. The memory includes at least one of semiconductor memories such as a RAM, a ROM, and a flash memory. Functions of the controller 12 are achieved by the CPU executing programs stored in a non-transitory tangible storage medium. In the present example, the memory corresponds to the non-transitory tangible storage medium that stores the programs.

The controller 12 may include one microcomputer or two or more microcomputers. The functions of the controller 12 may be achieved not only by using a software. A part or all of the functions of the controller 12 may also be achieved by using a hardware having a combination of a logical circuit, an analog circuit, and the like.

The controller 12 executes drive control of the motor 2 in accordance with the manipulation information inputted from the manipulation switch 5. If the manipulation switch 5 is turned ON, then the controller 12 drives the motor 2 to bring the rotational frequency of the motor 2 to the rotational frequency indicated in the rotational frequency command information that is included in the manipulation information.

More specifically, the controller 12 outputs, to the gate driver 13, a drive command for switching the ON and OFF states of each of the switching elements Q1 to Q6 in the switching circuit 11.

In accordance with the drive command inputted from the controller 12, the gate driver 13 individually switches the ON and OFF states of each of the switching elements Q1 to Q6. This completes the electric conduction to the motor 2 and causes the motor 2 to rotate. In response to the rotation of the motor 2, the working machine element 10 is driven, which enables the electric working machine 1 to work.

The controller 12 controls the electric current to the motor 2 by a PWM control using the switching circuit 11 and controls the rotational frequency of the motor 2. The controller 12 also monitors the electric current detection information inputted from the current detection circuit 15. If the current value of the electric current flowing in the motor 2 exceeds an excess current threshold value, then the controller 12 stops electric conduction to the motor 2.

The voltage suppressor circuit 30 is coupled to the main current path 21 in parallel with the motor driver 4. The motor driver 4 and the voltage suppressor circuit 30 receive drive voltage from the battery 3 via the manipulation switch 5. In the present embodiment, when the manipulation switch 5 is placed in the ON-state, a voltage value Vd, which is the voltage value of the drive voltage, is equal to or substantially equal to a voltage value Vbat, which is a battery voltage of the battery 3.

To inhibit the voltage value Vd from becoming greater than a specified threshold value, the voltage suppressor circuit 30 makes the electric current flowing from the battery 3 to the main current path 21 partially bypassed to the voltage suppressor circuit 30 in an event that the voltage value Vd is equal to or greater than the threshold value.

As mentioned above, the battery 3 includes the inductive component 3a. The main current path 21 itself also includes an inductive component. This causes the spike voltage, in other words, an event that the voltage value Vd exceeds the voltage value Vbat, when the motor 2 is driven in response to the switching of the ON and OFF states of each of the switching elements Q1 to Q6 in the switching circuit 11. The spike voltage occurs when the electric current that flows to the motor 2 is interrupted as a result of at least one of the switching elements Q1 to Q6 being switched from the ON-state to the OFF-state. Depending on the voltage value of the spike voltage, the switching elements Q1 to Q6 in the switching circuit 11 and/or other circuit elements may be damaged due to the occurrence of the spike voltage.

To inhibit the occurrence of the spike voltage by a voltage control circuit 30, the voltage suppressor circuit 30 is arranged in parallel with the motor driver 4 in the electric working machine 1 in the present embodiment.

(2) Detailed Configuration and Functions of Voltage Suppressor Circuit

The voltage suppressor circuit 30 includes a bypass current path 31 to make the electric current that flows in the main current path 21 partially bypassed. The bypass current path 31 is coupled to the main current path 21 in parallel with the main current path 21.

The bypass current path 31 includes a switch Q10 to complete and interrupt the bypass current path 31. The switch Q10 is a n-channel MOSFET in the present embodiment.

The switch Q10 is arranged so that the drive voltage is applied to its drain. A source of the switch Q10 is coupled to the ground line via a resistor 34.

The voltage suppressor circuit 30 also includes a switch driver 32. The switch driver 32 turns the switch Q10 OFF and interrupts the bypass current path 31 in an event that the voltage value Vd is less than the threshold value. As a consequence, no electric current flows into the voltage suppressor circuit 30 from the main current path 21 in the event that the voltage value Vd is less than the threshold value. Meanwhile, the switch driver 32 turns the switch Q10 ON and completes the bypass current path 31 in the event that the voltage value Vd is equal to or greater than the threshold value. As the bypass current path 31 is completed, the electric current that flows in the main current path 21 is partially bypassed to the bypass current path 31.

The switch driver 32 in the present embodiment is not configured to fully turn the switch Q10 ON (that is, operate the switch Q10 in a saturation region) but is configured to operate the switch Q10 in an active region to complete the bypass current path 31 in the event that the voltage value Vd is equal to or greater than the threshold value. In the present embodiment, operating the switch Q10 in the active region is not limited to constant operation of the switch Q10 in the active region, in other words, no operation of the switch Q10 in the saturation region when completing the bypass current path 31. It also means that, in the entire time duration of operation of the switch Q10, the switch Q10 is operated longer in the active region than in the saturation region.

As shown in FIG. 1, the switch driver 32 more specifically includes a Zener diode 36 and a resistor 37 coupled in series. A cathode of the Zener diode 36 is coupled to an upstream end of the bypass current path 31 (i.e., coupled to the drain of the switch Q10). An anode of the Zener diode 36 is coupled to a first end of the resistor 37. A second end of the resistor 37 is coupled to the ground line.

The anode of the Zener diode 36 is coupled to a gate of the switch Q10 via a resistor 33. In other words, the voltage at the first end of the resistor 37 is applied to the gate of the switch Q10 via the resistor 33.

The switch driver 32 is configured such that the Zener diode 36 does not break down in the event that the voltage value Vd is less than the threshold value but breaks down in the event that the voltage value Vd is equal to or greater than the threshold value. In other words, in the present embodiment, the threshold value is substantially equal to the sum of a Zener voltage, which is the breakdown voltage of the Zener diode 36, and a gate-source voltage (hereinafter referred to as gate-on-voltage), which is necessary to turn the switch Q10 ON. To turn the switch Q10 "ON" means that the switch Q10 is placed in a state where the switch Q10 operates in the active region in response to a drain current flowing in the switch Q10.

Due to the aforementioned configuration, the Zener diode 36 does not break down in the event that the voltage value Vd is less than the threshold value; and thus the switch Q10 is turned OFF. In this case, the bypass current path 31 is interrupted; and thus the electric current that flows in the main current path 21 is not bypassed to the bypass current path 31.

Meanwhile, the Zener diode 36 breaks down in the event that the voltage value Vd is equal to or greater than the threshold value, which causes a voltage drop through the resistor 37. This brings the value of voltage at the first end of the resistor 37, which is a gate voltage value of the switch Q10, to a value that enables the operation of the switch Q10 in the active region. In this case, the switch Q10 is turned ON; the bypass current path 31 is completed; and the electric current that flows in the main current path 21 is partially bypassed to the bypass current path 31.

During the time period that the electric current is flowing in the bypass current path 31, the voltage value Vd is clamped at substantially the same value as the sum of the Zener voltage and the gate-on-voltage. During this time period, the electric power supplied from the battery 3 via the main current path 21 is partially consumed in the switch Q10 and the resistor 34.

(3) Effect of Embodiment

The aforementioned embodiment provides the following effects.

(3a) The ON and OFF control of the switching elements Q1 to Q6 in the switching circuit 11 causes the spike voltage, which leads to an increase in the voltage value Vd. However, the voltage suppressor circuit 30 inhibits the increase in the voltage value Vd once the voltage value Vd becomes equal to or greater than the threshold value.

More specifically, the bypass current path 31 is completed in the voltage suppressor circuit 30 in the event that the voltage value Vd is equal to or greater than the threshold value, which makes the electric current supplied from the battery 3 is partially bypassed to the bypass current path 31. As a result, a further increase in the voltage value Vd in excess of the threshold value can be inhibited.

In other words, the electric working machine 1 in the present embodiment can inhibit the occurrence of the spike voltage without using an electrolytic capacitor having a large capacity as conventionally used, but with the voltage suppressor circuit 30 that is smaller in size than such a large-capacity electrolytic capacitor. Accordingly, a size increase of the electric working machine 1 can be inhibited and the occurrence of the spike voltage, due to the switching of ON-state and OFF-state of the switching elements Q1 to Q6 to drive the motor 2, can be effectively inhibited.

(3b) The switch driver 32 operates the switch Q10 in the active region to complete the bypass current path 31 in the event that the voltage value Vd is equal to or greater than the threshold value. This inhibits an excess flow of electric current into the bypass current path 31 due to the operation of the switch Q10 in the active region when the electric current flowing in the main current path 21 is bypassed to the bypass current path 31.

As a result, the resistor 34 that is coupled to the switch Q10 in series can be a resistor with a small resistance value and a small rated power.

(3c) The switch driver 32 includes the Zener diode 36 and the resistor 37 coupled in series with each other and is configured so that the Zener diode 36 breaks down to cause the switch Q10 to be operated in the active region in the event that the voltage value Vd is equal to or greater than the threshold value. With this simple configuration including the Zener diode 36 and the resistor 37 coupled in series with each other, the switch driver 32 can operate the switch Q10 in the active region and complete the bypass current path 31 in the event that the voltage value Vd is equal to or greater than the threshold value.

The switching elements Q1 to Q6 in the switching circuit 11 correspond to one example of a first semiconductor switching element in the present disclosure. The switch Q10 in the voltage suppressor circuit 30 corresponds to one example of a second semiconductor switching element in the present disclosure. The manipulation switch 5 corresponds to one example of a switch portion in the present disclosure. The combination of the switching circuit 11 and the motor 2 corresponds to one example of a driving unit in the present disclosure.

Other Embodiments

Although the embodiment of the present disclosure has been explained hereinbefore, the present disclosure may be achieved in various modifications without being limited to the aforementioned embodiment.

(1) In the aforementioned embodiment, the switching elements Q1 to Q6 in the switching circuit 11 and the switch Q10 are n-channel MOSFETs, for example. Nevertheless, the switching elements Q1 to Q6 and the switch Q10 may be other semiconductor switching elements different from the n-channel MOSFETs. More specifically, the switching elements Q1 to Q6 and the switch Q10 may be, for example, p-channel MOSFETs, bipolar transistors, thyristors, and IGBTs.

(2) In place of the voltage suppressor circuit 30 in the aforementioned embodiment, a voltage control circuit of another circuit configuration having a function equivalent to the voltage suppressor circuit 30 may be used. More specifically, it is not a requirement that the switch driver 32 includes the Zener diode 36 as described in the aforementioned embodiment. The switch driver 32 may operate the switch Q10 with another circuit element other than the Zener diode 36.

It is also not a requirement that the switch driver 32 operates the switch Q10 in the active region. The switch driver 32 may operate the switch Q10 in the saturation region, for example. More specifically, the switch driver 32 may include, for example, a comparator in place of the Zener diode 36. In this case, the switch driver 32 may use the comparator to compare the voltage value Vd with the threshold value and output an H-level signal from the comparator to the switch Q10 to turn the switch Q10 ON in the event that the voltage value Vd is equal to or greater than the threshold value.

(3) The motor 2, the driving source of the working machine element 10, may be another motor other than the brushless motor. The motor 2 may be, for example, another alternating current motor other than the brushless motor, or a brushed direct current motor.

Figure 2A:
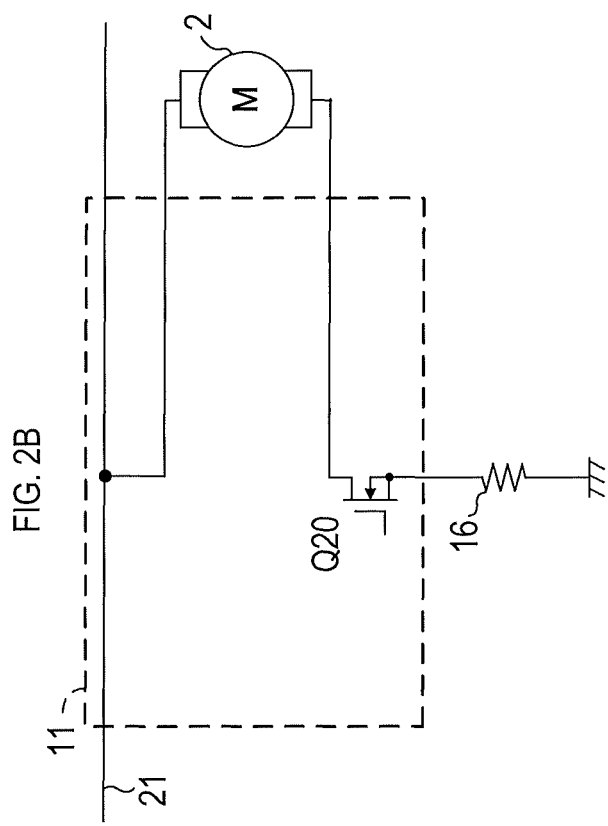
FIG. 2A and FIG. 2B are modified examples of a switching circuit.
Figure 2B:
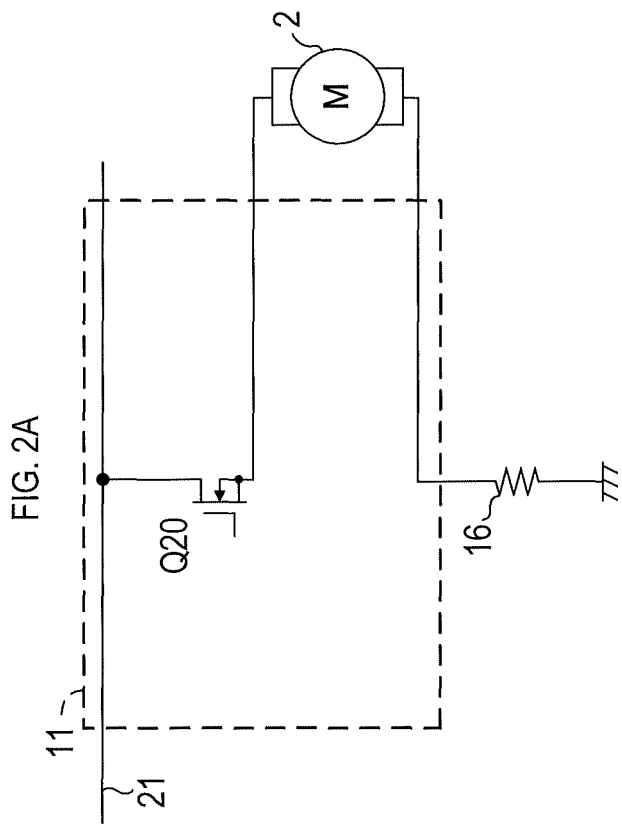

(4) The number and the location of the semiconductor switching elements used for controlling the electric conduction to the motor may be determined appropriately. For example, when the motor 2 is a brushed direct current motor, then the switching circuit 11 may include at least one semiconductor switching element Q20 situated upstream of the motor 2 as shown in FIG. 2A, or at least one semiconductor switching element Q20 situated downstream of the motor 2 as shown in FIG. 2B.

(5) In addition, one function of one element in the aforementioned embodiment may be divided as two or more elements. Functions of two or more elements may be integrated into one element. At least a part of the configuration of the aforementioned embodiment may be replaced with a publicly known configuration having the similar function. A part of the configuration of the aforementioned embodiment may be omitted. At least a part of the configuration of the aforementioned embodiment may be added to or replaced with another configuration of the aforementioned embodiment.

(6) The present disclosure can be achieved in various other forms other than the aforementioned electric working machine, such as a system including the electric working machine as one element, a voltage suppressor circuit in the electric working machine, and a voltage-suppressing method used particularly in the voltage suppressor circuit in the electric working machine.

The invention claimed is:

1. An electric working machine comprising:
a main current path arranged between a positive electrode and a negative electrode of a battery;
a driving unit situated in the main current path, the driving unit including a motor situated in the main current path, and at least one first semiconductor switching element situated upstream and/or downstream of the motor in the main current path;
a controller configured to turn ON or OFF the at least one first semiconductor switching element to thereby control drive of the motor;
a bypass current path arranged in parallel with the driving unit;
a second semiconductor switching element situated in the bypass current path and configured to complete or interrupt the bypass current path; and
a switch driver configured to cause the second semiconductor switching element to interrupt the bypass current path in response to a voltage value of a drive voltage being less than a threshold value, the switch driver further configured to cause the second semiconductor switching element to complete the bypass current path in response to the voltage value being equal to or greater than the threshold value, and the drive voltage being applied to the driving unit,
the switch driver being configured to, while the voltage value is equal to or greater than the threshold value, operate the second semiconductor switching element so as to be operated longer in an active region than in a saturation region to thereby complete the bypass current path.

2. The electric working machine according to claim 1, wherein the motor is configured to drive a rotary blade or a driver bit.

3. The electric working machine according to claim 1, configured as one of an electric grinder, electric circular saw, electric jigsaw, electric reciprocating saw, electric driver, electric impact driver, electric driver drill, electric grass cutter, or electric hedge trimmer.

4. A method for suppressing voltage in an electric working machine, the method comprising:
providing a driving unit in a main current path, the main current path being arranged between a positive electrode and a negative electrode of a battery, the driving unit being configured such that a drive voltage is applied thereto from the battery, the driving unit including a motor situated in the main current path, and a first semiconductor switching element situated upstream or downstream of the motor in the main current path;
connecting a bypass current path to the main current path in parallel with the driving unit;
providing a second semiconductor switching element in the bypass current path, the second semiconductor switching element being configured to complete or interrupt the bypass current path;
causing the second semiconductor switching element to interrupt the bypass current path in response to a voltage value of the drive voltage being less than a threshold value; and
while the voltage value is equal to or greater than the threshold value, operating the second semiconductor switching element so as to be operated longer in an active region than in a saturation region to thereby complete the bypass current path.

5. The electric working machine according to claim 1, wherein the battery includes inductance, and
wherein the voltage value is equal to or greater than the threshold value due to the inductance when the first semiconductor switching element is shifted from an ON-state to an OFF-state.

6. The method according to claim 4,
wherein the battery includes inductance, and
wherein the voltage value is equal to or greater than the threshold value due to the inductance when the first semiconductor switching element is shifted from an ON-state to an OFF-state.

* * * * *